United States Patent [19]

Katoh et al.

[11] Patent Number: 5,000,529
[45] Date of Patent: Mar. 19, 1991

[54] OPTICAL SCANNER

[75] Inventors: Hiroaki Katoh, Inagi; Yoshitaka Murakawa, Fuchu; Toshimasa Miyazaki, Yamato; Nobuyuki Kitamura, Zama, all of Japan

[73] Assignee: Fujitsu Limited, Kawasaki, Japan

[21] Appl. No.: 510,202

[22] Filed: Apr. 17, 1990

[30] Foreign Application Priority Data

Apr. 20, 1989 [JP] Japan ................................ 1-101000

[51] Int. Cl.⁵ .............................................. G02B 26/10
[52] U.S. Cl. ..................................... 350/6.7; 250/236; 235/467
[58] Field of Search ........................ 350/6.7, 6.8, 3.71; 250/235, 236; 235/467, 470; 346/108; 358/296

[56] References Cited

U.S. PATENT DOCUMENTS

| | | | |
|---|---|---|---|
| 4,084,092 | 4/1978 | Runciman | 350/6.8 |
| 4,413,878 | 11/1983 | Lettington | 350/6.7 |
| 4,458,982 | 7/1984 | Blain et al. | 350/6.7 |
| 4,753,498 | 6/1988 | Saitoh et al. | 350/6.8 |
| 4,799,164 | 1/1989 | Hellekson et al. | 350/3.71 |
| 4,938,551 | 7/1990 | Matsumoto | 350/6.7 |

FOREIGN PATENT DOCUMENTS 63-292108 11/1988 Japan .
1-19913 1/1989 Japan .
1-24217 1/1989 Japan .

Primary Examiner—Bruce Y. Arnold
Assistant Examiner—Loha Ben
Attorney, Agent, or Firm—Staas & Halsey

[57] ABSTRACT

An optical scanner is disclosed wherein coded bars are scanned by a laser beam to effect reading of a bar code of the coded bars. The optical scanner includes a rotary polygon mirror having a plurality of reflecting portions provided thereon around an axis of rotation thereof for reflecting a laser beam from a light source toward coded bars. Each reflecting portion of the rotary polygon mirror has a plurality of reflecting faces having different inclination angles from each other with respect to the axis of rotation such that an inclination angle of a line of intersection between adjacent reflecting faces of each reflecting portion with respect to the axis of rotation is different from an inclination angle of a line of intersection between adjacent reflecting faces of each of adjacent ones of the reflecting portions on the opposite sides of the reflecting portion with respect to the axis of rotation. Where the rotary polygon mirror of the construction is used, a scanning pattern which is constituted from scanning lines of various directions can be obtained from the rotary polygon mirror. The optical scanner can thus be reduced in overall size and production cost of the device.

7 Claims, 5 Drawing Sheets

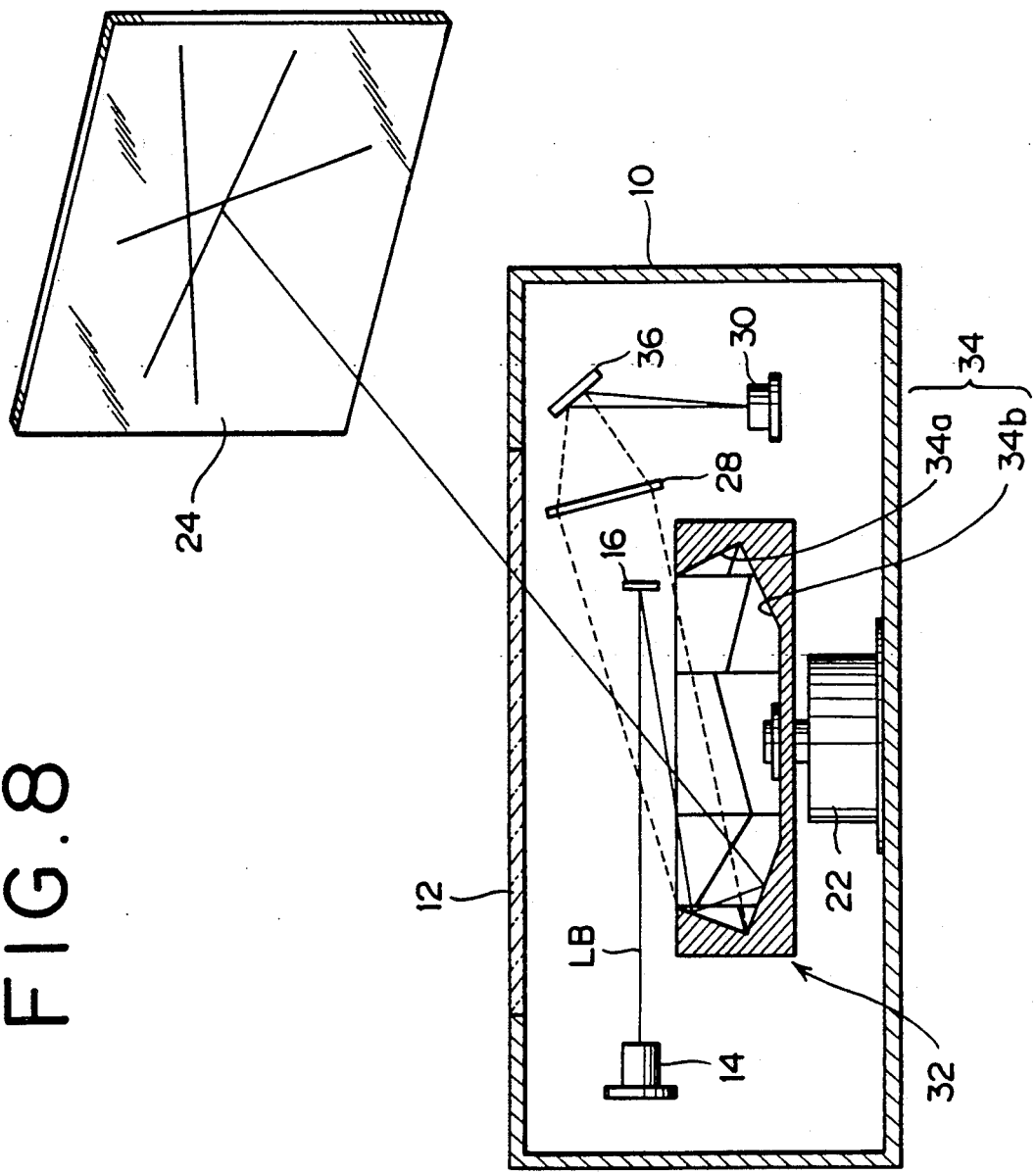

OPTICAL SCANNER

BACKGROUND OF THE INVENTION

This invention relates to an optical scanner for scanning coded bars by means of a laser beam to read a bar code of the coded bars.

POS (point of sales) system are introduced in many department stores and supermarkets in order to improve the efficiency in management of commodities and checking out operations. In such systems, a bar code reader including an optical scanner is used which scans coded bars attached to a commodity by means of a laser beam, detects diffused signal light from the coded bars by means of a photodetector and converts it into a signal having a form of information suitable for subsequent calculation processing. Such bar code reader is commonly constituted from a laser beam generating source, a laser beam shaping optical system, a scanning optical system, a signal light detecting optical system, a waveform shaping circuit and a bar code demodulating circuit. A laser beam emitted from a He-Ne laser is shaped into a laser beam of a suitable size by the beam shaping optical system, and a scanning pattern for the universal reading is formed with the thus shaped laser beam by the scanning optical system and the laser beam is irradiated upon coded bars with the scanning pattern. Diffused light reflected from the coded bars is condensed by the signal light detecting optical system and the signal light is converted into an electric signal by the photodetector. The electric signal is shaped by the signal waveform shaping circuit and then vonverted into a numerical value by the bar code demodulating circuit, and the numerical value thus obtained is transmitted to a POS terminal.

While various types of optical scanners for use with such bar code readers have been proposed and put into practical use, they can be roughly divided into two types including a type which employs a rotary polygon mirror and the other type which employs a hologram disk. Conventional optical scanners of either of the two types are commonly disadvantageous in that, since a scanning pattern generating mirror device including a plurality of reflecting mirrors must be provided in order to obtain a scanning pattern which is composed of a plurality of scanning lines of various directions, the number of components is increased, and the cost is high, and besides miniaturization of the device cannot be achieved. Further, in order to obtain a long or great beam pattern, the reflecting mirrors must necessarily be large in size, which also makes a cause of rise in cost and an obstacle to miniaturization of the device.

SUMMARY OF THE INVENTION

Accordingly, it is an object of the present invention to provide an optical scanner which can be reduced in size and in production cost.

It is another object of the present invention to provide a rotary polygon mirror which is suitable to generate a scanning pattern formed from a plurality of scanning lines of different directions.

In accordance with an aspect of the present invention, there is provided an optical scanner for scanning coded bars by means of a laser beam to read a bar code of the coded bars, which comprises a light source for generating a laser beam, a rotary polygon mirror having a plurality of reflecting portions provided thereon around an axis of rotation thereof for reflecting the laser bean from the light source toward the coded bars, each of the reflecting portions of the rotary polygon mirror including a plurality of flattened reflecting faces having different inclination angles from each other with respect to the axis of rotation such that an inclination angle of a line of intersection between adjacent ones of the flattened reflecting faces of each of the reflecting portions with respect to the axis of rotation is different from an inclination angle of a line of intersection between adjacent ones of the flattened reflecting faces of each of adjacent ones of the reflecting portions on the opposite sides of the reflecting portion with respect to the axis of rotation, and a photodetector for detecting diffused signal light diffused by the coded bars.

Preferably, an included angle between adjacent ones of the flattened reflecting faces of each of the reflecting portions of the rotary polygon mirror is different from an included angle between adjacent ones of the flattened reflecting faces of adjacent ones of the reflecting portions on the opposite sides of the reflecting portion.

In accordance with another aspect of the present invention, there is provided a rotary polygon mirror adapted to produce a scanning pattern constituted from a plurality of scanning lines of different directions, the rotary polygon mirror having a plurality of reflecting portions provided around an axis of rotation thereof, each of the reflecting portions having a plurality of flattened reflecting faces having different inclination angles from each other with respect to the axis of rotation such that an inclination angle of a line of intersection between adjacent ones of the flattened reflecting faces of each of the reflecting portions with respect to the axis of rotation is defferent from an inclination angle of a line of intersection between adjacent ones of the flattened reflecting faces of each of adjacent ones of the reflecting portions on the opposite sides of the reflecting portion with respect to the axis of rotation.

The above and other objects, features and advantages of the present invention and the manner of realizing them will become more apparent, and the invention itself will best be understood, from a study of the following description and appended claims, with reference to the attached drawings showing some preferred embodiments of the invention.

BRIEF DESCRIPTION OF THE DRAWINGS

FIG. 8 is a schematic view of another optical scanner showing a second preferred embodiment of the present invention.

DESCRIPTION OF THE PREFERRED EMBODIMENTS

Figure 1:
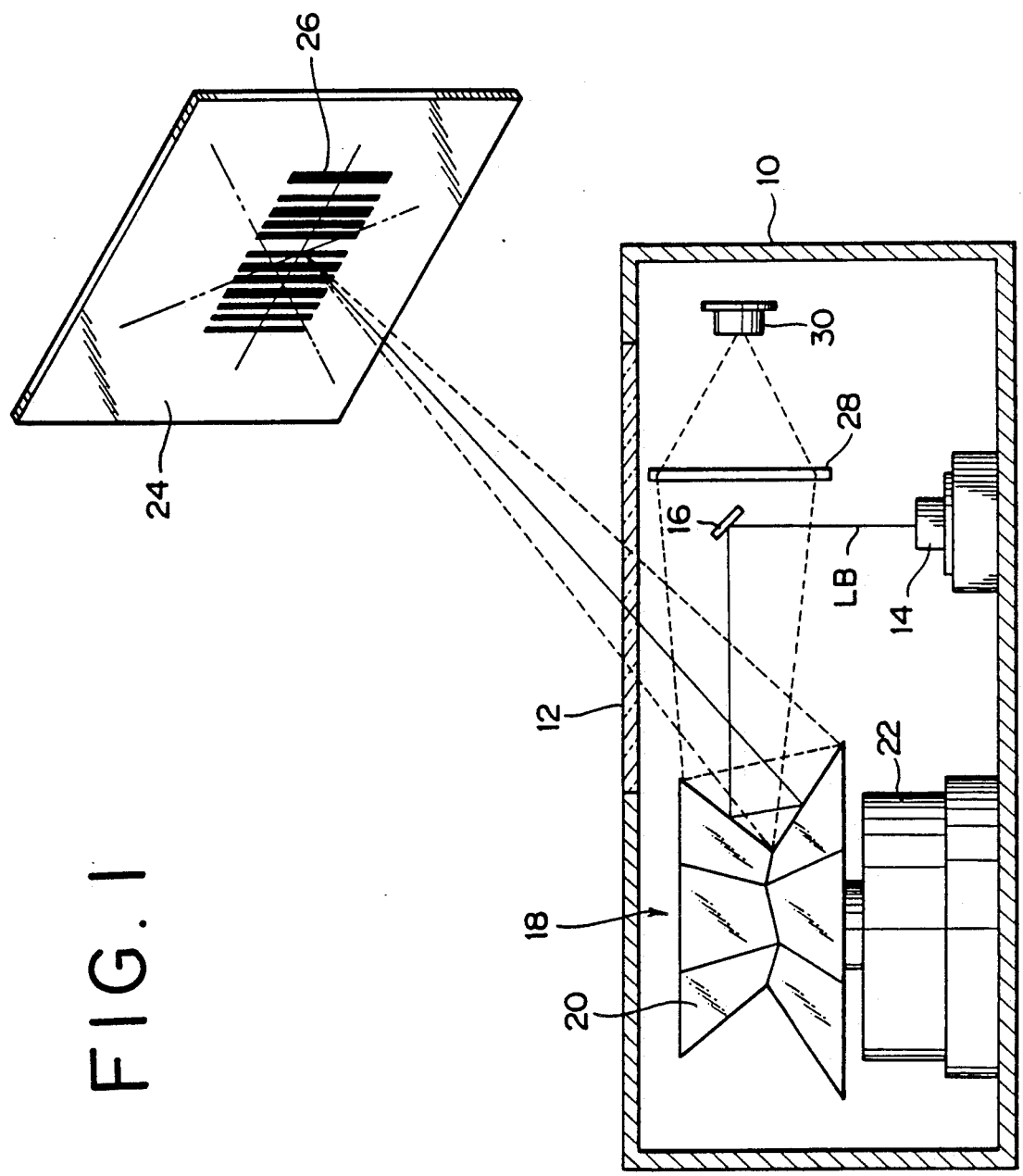
FIG. 1 is a schematic view of an optical scanner showing a first preferred embodiment of the present invention.

A first preferred embodiment of the present invention will first be described with reference to FIGS. 1 to 7. Referring first to FIG. 1, a reading window 12 is provided at the top of a casing 10. A light source 14 for generating a laser beam such as a He-Ne laser or the like is provided in the casing 10, and a laser beam LB emitted from the light source 14 is reflected by a mirror 16 and introduced to a rotary polygon mirror 18. The rotary polygon mirror 18 has a plurality of reflecting portions 20 on an outer periphery thereof and is rotated around an axis of rotation thereof by a motor 22. The laser beam LB reflected by a reflecting portion 20 of the rotary polygon mirror 18 scans coded bars 26 attached to a commodity 24. Since the reflecting portions 20 of the rotary polygon mirror 18 have different reflecting directions for a beam as hereinafter described, the rotary polygon mirror 18 produces a scanning pattern which is composed of a plurality of scanning lines of different directions so that the laser beam may scan the entire coded bars 26 attached to the commodity 24 irrespective of an orientation of the coded bars 26. Diffused signal light diffused by the coded bars 26 is once reflected by the reflecting portion 20 of the polygon mirror 18 and condensed to or focused upon a photodetector 30 by a condenser lens 28 as indicated by broken lines in FIG. 1.

Figure 2:
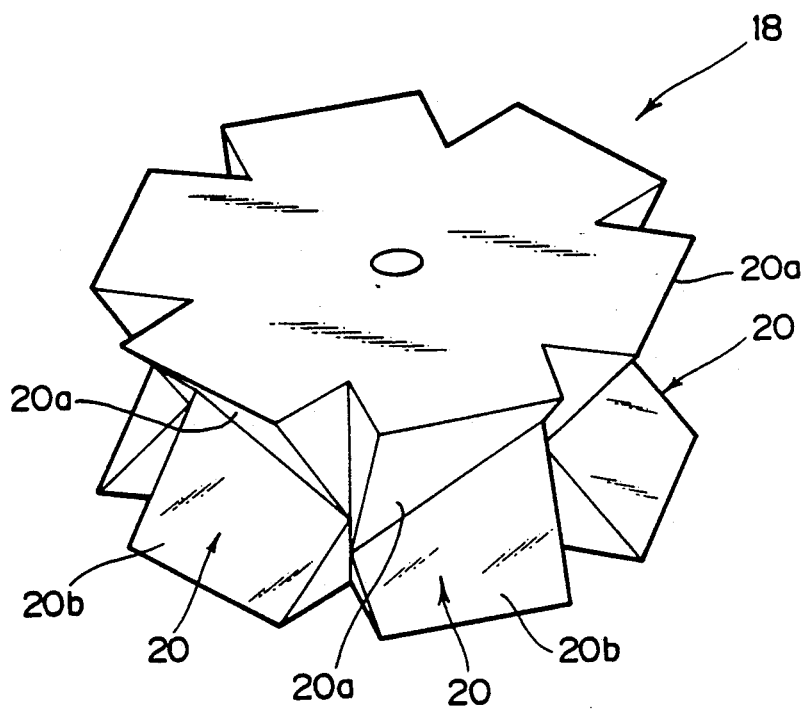
FIG. 2 is a perspective view of a rotary polygon mirror shown in FIG. 1.
Figure 4:
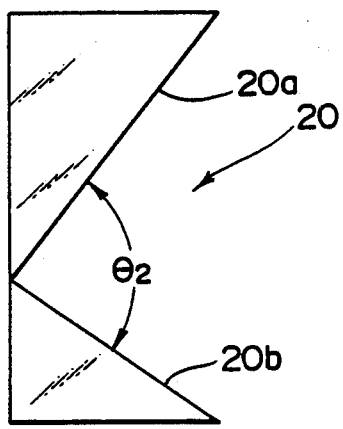
FIG. 4 is a side elevational view of the reflecting portion shown in FIG. 3.
Figure 3:
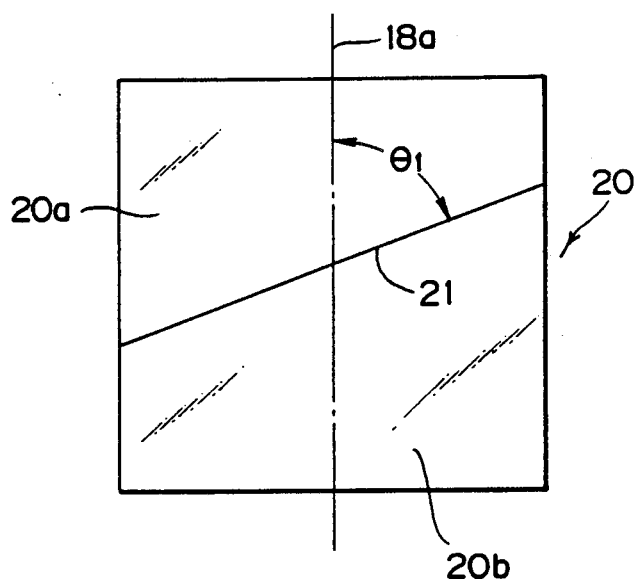
FIG. 3 is a front elevational view of one of reflecting portions of the rotary polygon mirror shown in FIG. 1.

Construction of the rotary polygon mirror 18 which is an essential part of the present invention will be described with reference to FIGS. 2 to 4. The rotary polygon mirror 18 has a plurality of (6 in the present embodiment) reflecting portions 20 disposed around the axis thereof, and each of the reflecting portions 20 includes a pair of reflecting faces 20a and 20b. Referring particularly to FIG. 3, where an angle defined by a line 21 of intersection between the reflecting faces 20a and 20b of each of the reflecting portions 20 and the axis 18a of rotation of the rotary polygon mirror 18 is represented by $\theta_1$, the rotary polygon mirror 18 is formed such that the value of the angle $\theta_1$ of each of the reflecting portions 20 thereof may be different from those angles $\theta_1$ of adjacent reflecting portions 20 on the opposite sides of the reflecting portion 20. Meanwhile, referring to FIG. 4, where an included angle between the reflecting faces 20a and 20b of each of the reflecting portions 20 of the rotary polygon mirror 18 is represented by $\theta_2$, the rotary polygon mirror 18 is formed also such that the value of the angle $\theta_2$ of each reflecting portion 20 thereof may be different from the included angles $\theta_2$ of adjacent reflecting portions 20.

In particular, in the present embodiment shown in the drawings, the rotary polygon mirror 18 is formed such that it has six reflecting portions 20 and the values of $\theta_1$ and $\theta_2$ of each of the reflecting portions 20 are different from the values of $\theta_1$ and $\theta_2$ of adjacent reflecting portions 20 on the opposite sides of the reflecting portion 20, respectively. Each pair of those of the reflecting portions 20 which are positioned on the opposite sides with respect to the axis 18a of rotation are equal in inclination angle $\theta_1$ and included angle $\theta_2$ to each other.

Figure 7:
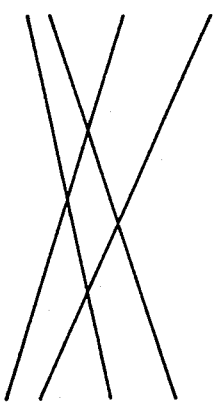
FIG. 7 is a similar view but illustrating a scanning pattern when the angles $\theta_1$ and $\theta_2$ in FIGS. 3 and 4 are both varied.
Figure 6:
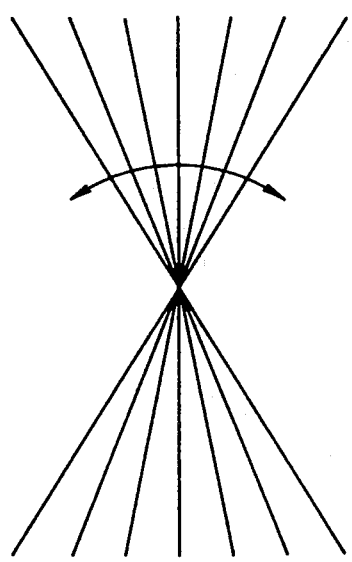
FIG. 6 is a similar view but illustrating a scanning pattern when another angle $\theta_1$ shown in FIG. 3 is varied.
Figure 5:
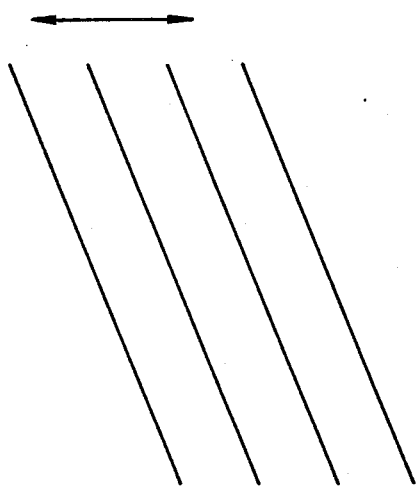
FIG. 5 is a diagrammatic representation illustrating a scanning pattern when an angle $\theta_2$ shown in FIG. 4 is varied.

In operation, a laser beam LB emitted from the light source 14 is reflected by the mirror 16 and introduced to the rotary polygon mirror 18. The laser beam LB reflected by the reflecting face 20a of a reflecting portion 20 of the rotary polygon mirror 18 which is rotating at a high speed is reflected again by the other opposing reflecting face 20b and scans coded bars 26 of a commodity 24 through the reading window 12. Here, if the angle $\theta_1$ is otherwise equal among all of the reflecting portions 20 of the rotary polygon mirror 18 while only the angle $\theta_2$ varies between each adjacent ones of the reflecting portions 20, then a pattern with which the laser beam LB is to scan the coded bars 26 is constituted from a plurality of such parallel scanning lines of the same direction as seen in FIG. 5. On the other hand, if the angle $\theta_2$ is equal among all of the reflecting portions of the rotary polygon mirror 18 while only the angle $\theta_1$ varies between each adjacent ones of the reflecting portions 20, then a pattern with which the laser beam LB is to scan the coded bars 26 is constituted from such a plurality of scanning lines which intersect at a particular point as seen in FIG. 6. Accordingly, where both of the angles $\theta_1$ and $\theta_2$ vary between each adjacent ones of the reflecting portions 20 of the rotary polygon mirror 18 as in the embodiment described above, such a scanning pattern is produced which is constituted from a plurality of scanning lines of various directions as seen in FIG. 7. If the coded bars 26 on the commodity 24 are scanned with such a scanning pattern as described just above, the entire coded bars 26 can be scanned by at least one of such scanning lines irrespective of an orientation of the coded bars 26.

Diffused signal light from the coded bars 26 advances reversely along the passage of the scanning beam and is thus reflected by the rotary polygon mirror 18 and then focused upon the photodetector 30 by the condenser lens 28. The photodetector 30 converts the received diffused signal light into an electric signal, which is then converted into a digital signal by an analog to digital converter not shown and decoded by a bar code demodulating circuit.

With the optical scanner of the construction described above, a scanning pattern which is composed of a plurality of scanning lines of various directions can be produced only by means of the rotary polygon mirror 18. Accordingly, such a hologram disk or a set of reflecting mirrors as in a conventional optical scanner is eliminated, which enables miniaturization and reduction in cost of the arrangement. Further, it the rotary polygon mirror 18 is formed by molding a body from a resin material and applying an aluminum film on the resin body by vapor deposition to form reflecting faces, it can be produced at a very low cost. Further, since a laser beam is reflected by a comparatively small number of times, reduction in amount of light can be minimized, and hence the output power of the light source 14 can be reduced.

Subsequently, a second embodiment of the present invention will be described with reference to FIG. 8. It is to be noted that, since the optical scanner of the present embodiment has somewhat similar construction to that of the optical scanner of the preceding embodiment, substantially like components are denoted by like reference numerals and overlapping description thereof is omitted herein to avoid redundancy.

The optical scanner of the present embodiment includes a mirror 36 for changing the advancing direction of diffused signal light condensed by a condenser lens 28 and adopts a rotary polygon mirror 32 having a substantially hexagonal tube which is open at the top thereof. A plurality of (six in the present embodiment) reflecting portions 34 are provided on an inner periphery of the rotary polygon mirror 32 and are each constituted from a pair of opposing reflecting faces 34a and 34b. The reflecting faces 34a and 34b of the reflecting portions 34 are disposed such that such a scanning pattern which is composed of a plurality of scanning lines of various directions as seen in FIG. 7 may be obtained similarly as in the first embodiment described above.

Since the optical scanner of the present embodiment has such construction as described just above, a scanning pattern constituted from a plurality of scanning lines of various directions can be obtained only with the rotary polygon mirror 32 similarly as in the optical scanner of the first embodiment. Accordingly, such a hologram disk or a set of reflecting mirrors as is required in a conventional optical scanner is eliminated, which enables miniaturization and reduction in cost of the arrangement. The optical scanner of the present embodiment further has such advantages as those of the optical scanner of the first embodiment described hereinabove.

Figure 9:
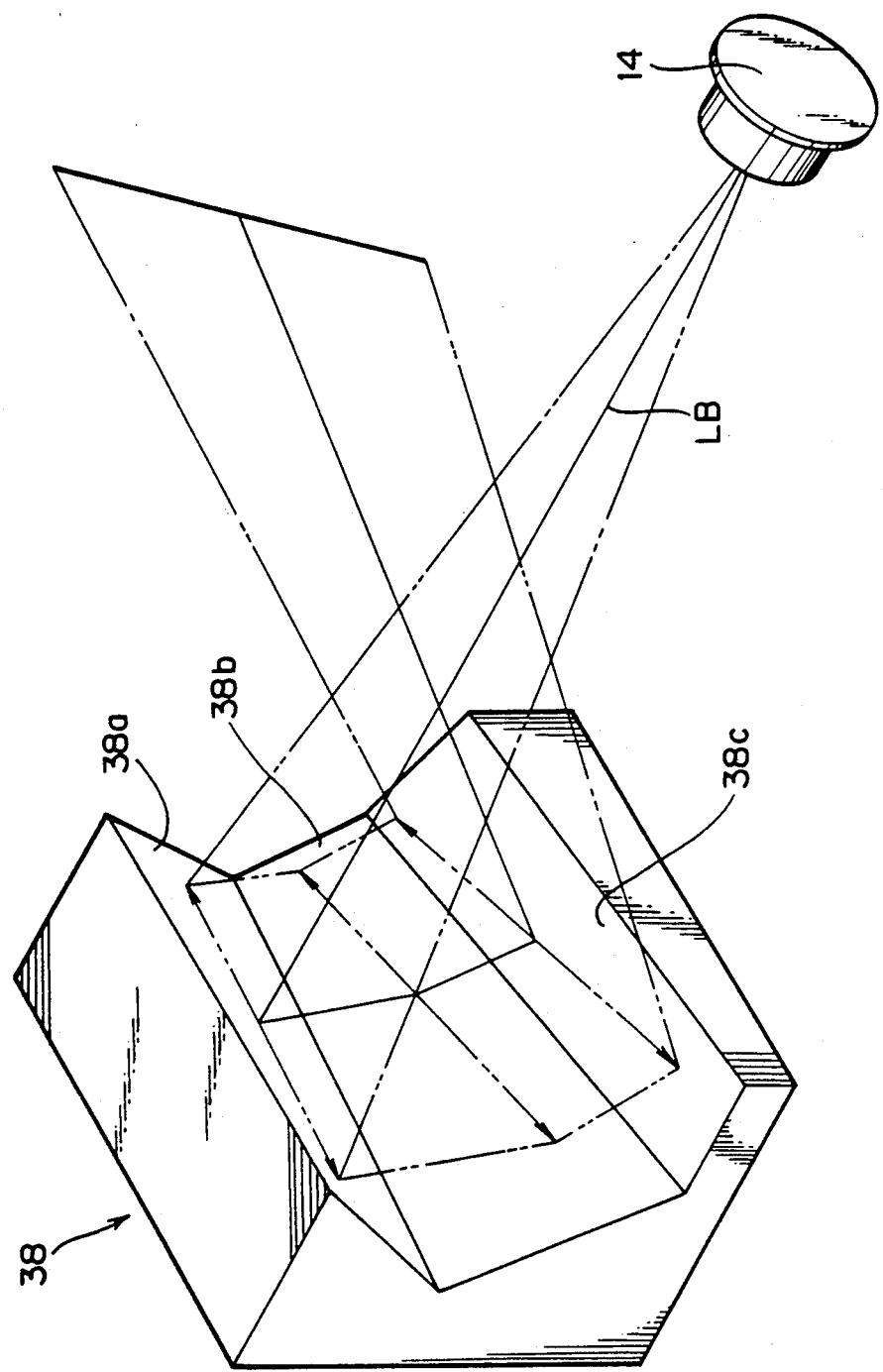
FIG. 9 is a schematic view of a further optical scanner showing a third preferred embodiment of the present invention wherein each of reflecting portions of a polygon mirror has three refleting faces.

In is to be noted that, while the optical scanners of the first and second embodiments are constituted such that each of the reflecting portions of the rotary polygon mirror has a pair of reflecting faces having different inclination angles with respect to the axis of rotation of the rotary polygon mirror, the number of such reflecting faces of each reflection portion is not limited to two. For example, as shown in FIG. 9, each reflecting portion 38 may include three reflecting faces 38a, 38b and 38c having different inclination angles with respect to the axis of rotation of the rotary polygon mirror.

What is claimed is:

1. An optical scanner for scanning coded bars by means of a laser beam to read a bar code of the coded bars, comprising:
   a light source for generating a laser beam;
   a rotary polygon mirror having a plurality of reflecting portions provided thereon around an axis of rotation thereof for reflecting the laser beam from said light source toward the coded bars, each of said reflecting portions of said rotary polygon mirror including a plurality of flattened reflecting faces having different inclination angles from each other with respect to the axis of rotation such that an inclination angle of a line of intersection between adjacent ones of said flattened reflecting faces of each of said reflecting portions with respect to the axis of rotation is different from an inclination angle of a line of intersection between adjacent ones of said flattened reflecting faces of each of adjacent ones of said reflecting portions on the opposite sides of said each of said reflecting portions with respect to the axis of rotation; and
   a photodetector for detecting diffused signal light diffused by the coded bars.

2. An optical scanner according to claim 1, wherein an included angle between adjacent ones of said flattened reflecting faces of each of said reflecting portions of said rotary polygon mirror is different from an included angle between adjacent ones of said flattened reflecting faces of adjacent ones of said reflecting portions on the opposite sides of said each of said reflecting portions.

3. An optical scanner according to claim 1, wherein said rotary polygon mirror has six reflecting portions, and each one of each pair of said reflecting portions which are positioned on the opposite sides with respect to the axis of rotation has a plurality of flattened reflecting faces which have the same arrangement as those of the other one of said pair of reflecting portions.

4. An optical scanner according to claim 1, wherein said reflecting portions are provided on an outer periphery of said rotary polygon mirror.

5. An optical scanner according to claim 1, wherein said rotary polygon mirror has a tubular configuration which is open at the top thereof, and said reflecting faces are provided on an inner periphery of said tubular rotary polygon mirror.

6. A rotary polygon mirror adapted to produce a scanning pattern constituted from a plurality of scanning lines of different directions, said rotary polygon mirror having a plurality of reflecting portions provided around an axis of rotation thereof, each of said reflecting portions having a plurality of flattened reflecting faces having different inclination angles from each other with respect to the axis of rotation such that an inclination angle of a line of intersection between adjacent ones of said flattened reflecting faces of each of said reflecting portions with respect to the axis of rotation is different from an inclination angle of a line of intersection between adjacent ones of said flattened reflecting faces of each of adjacent ones of said reflecting portions on the opposite sides of said each of said reflecting portions with respect to the axis of rotation.

7. A rotary polygon mirror according to claim 6, wherein an included angle between adjacent ones of said flattened reflecting faces of each of said reflecting portions of said rotary polygon mirror is different from an included angle between adjacent ones of said flattened reflecting faces of adjacent ones of said reflecting portions on the opposite sides of said each of said reflecting portions.

* * * * *